United States Patent [19]

Coblitz et al.

[11] 4,114,485
[45] Sep. 19, 1978

[54] PIPE CUTTER AND BEVELER

[75] Inventors: Sanford E. Coblitz, Ashtabula, Ohio; Bengt G. Bjalme, Erie, Pa.

[73] Assignee: Wheeler Manufacturing Corporation, Ashtabula, Ohio

[21] Appl. No.: 754,081

[22] Filed: Dec. 23, 1976

[51] Int. Cl.² .......................... B23B 3/22; B23B 3/04; B23D 21/06
[52] U.S. Cl. ...................... 82/4 C; 82/70.1; 30/95
[58] Field of Search .............. 82/4 C, 70.1, 70.2; 30/94, 95, 96

[56] References Cited

U.S. PATENT DOCUMENTS

| 504,786 | 9/1893 | Jungmann | 30/95 |
| 2,634,643 | 4/1953 | Krooss | 82/4 C |
| 2,699,604 | 1/1955 | Ingwer et al. | 82/4 C |
| 2,798,390 | 7/1957 | Bennett | 30/94 |
| 3,608,194 | 9/1971 | Miller | 30/94 |
| 3,798,765 | 3/1974 | Mattsson | 30/96 |

FOREIGN PATENT DOCUMENTS

| 180,041 | 10/1954 | Austria | 30/95 |
| 940,975 | 3/1956 | Fed. Rep. of Germany | 30/95 |
| 344,029 | 1/1960 | Switzerland | 82/70.1 |

Primary Examiner—Harrison L. Hinson
Attorney, Agent, or Firm—Woodling, Krost, Granger & Rust

[57] ABSTRACT

An apparatus is disclosed which is useful in cutting and beveling selective lengths of plastic pipe. The apparatus is supported on the pipe by reason of a closed frame which is releasably locked around the pipe. Rollers are provided in the frame for contacting the pipe. A roller slide is selectably positionable within the frame at a finite number of radial positions. The roller slide serves to adjust its rollers to accept and support the frame on the standard pipe sizes. Opposite the roller slide is a cutting and beveling blade which is radially adjustable into the center of the closed frame.

13 Claims, 10 Drawing Figures

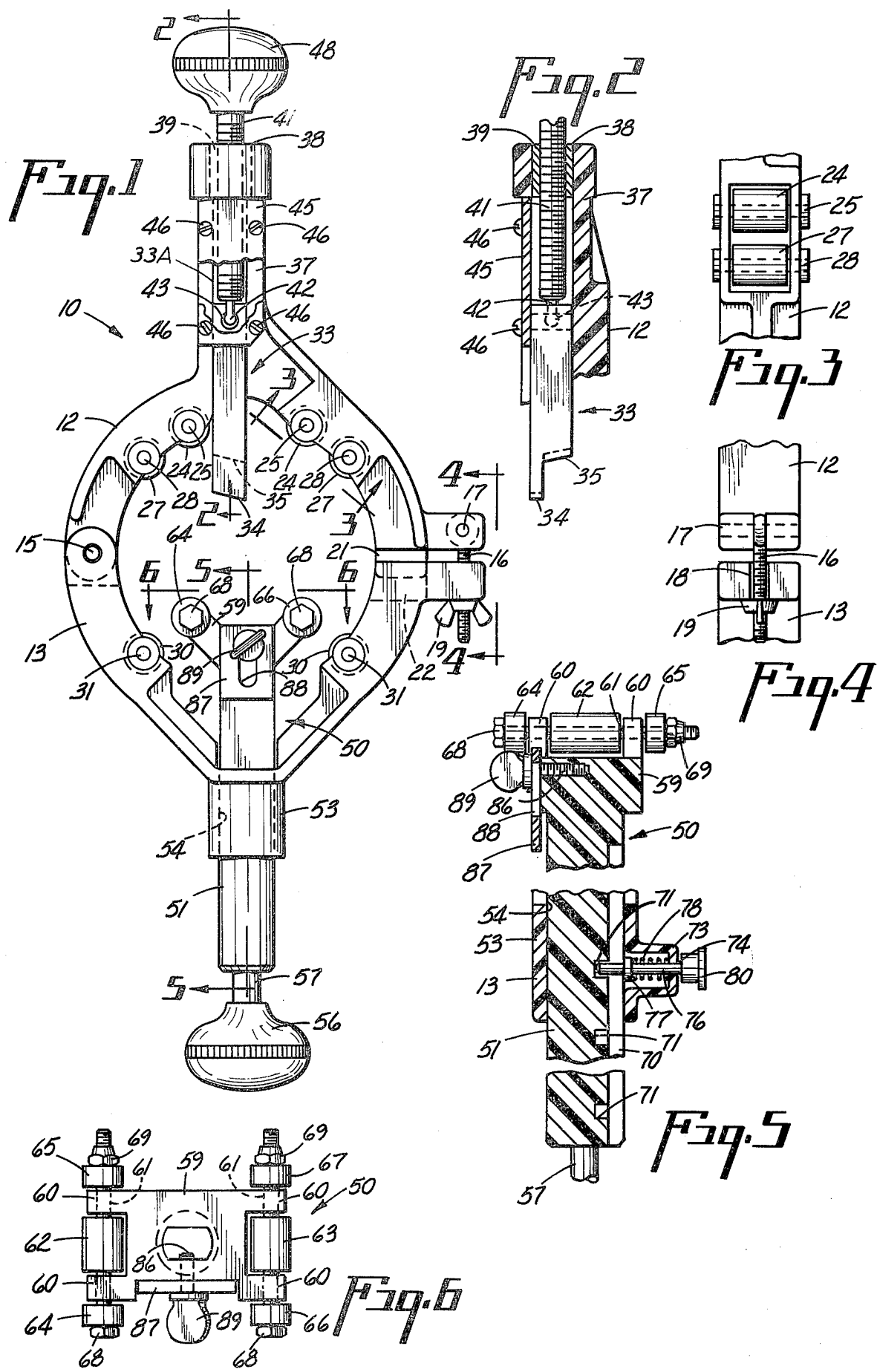

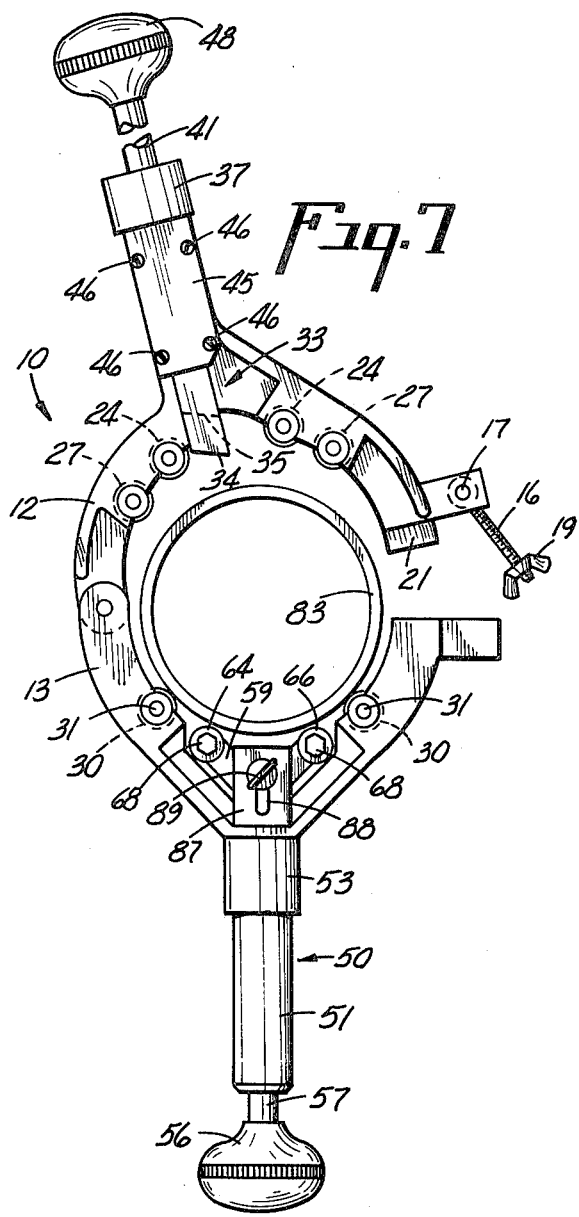
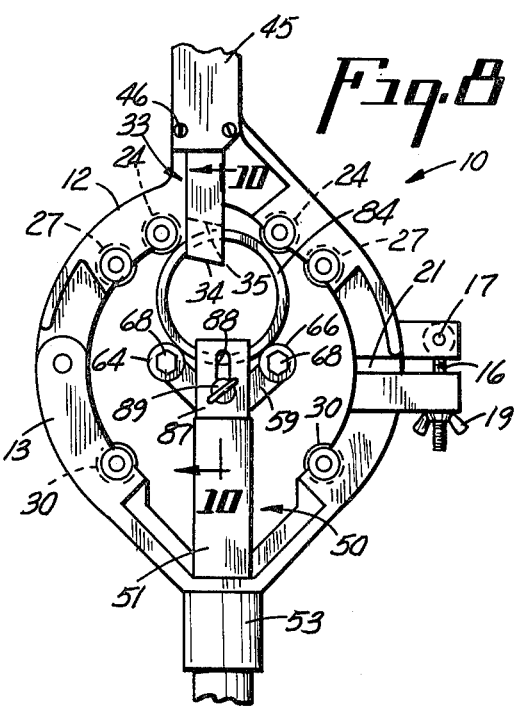
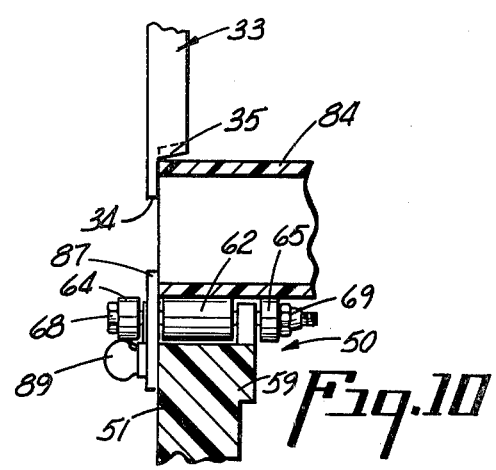
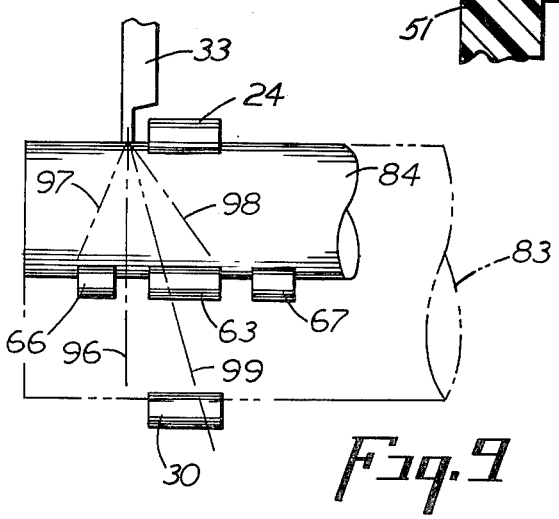

PIPE CUTTER AND BEVELER

BACKGROUND OF THE INVENTION

Pipes have long been used for the transportation of fluids from one point to another. The distance traveled may be long or short. The system of piping may be simple or complicated. The uses are varied, i.e. air, gas, liquids, steam, etc., and are increasing.

In recent years the use of plastic pipe, e.g. polyvinyl chloride, polypropylene, polybutylene, etc. has grown considerably. The increase is due largely to the advances in technology as to materials and manufacturing of the plastic pipe.

Where metal pipes were utilized, pipe portions were joined by threaded connections or sealed with lead or flexible seals. In the case of plastic pipes, the connections are generally made by applying glue or rubber seals between the portions.

In the use of plastic pipes there are two basic connections for pipes where a leakproof seal is required. First, the two pipes may be permanently fixed together by glue or other suitable means. In this case, the end of the pipe is inserted into a relatively tight fitting bell or coupler with glue applied to the mating surfaces. The end of the pipe which is inserted needs to have a clean, straight cut without sharp edges but not necessarily beveled.

The second connection involves a flexible seal surrounding the pipe and positioned between the two pipes to be connected. A bell or coupler portion of the piping system includes a groove in the inner surface into which a rubber seal ring is placed. An end of pipe is inserted into the bell or coupler and the seal ring. The sizes of the bell, seal ring and pipe are arranged so that the fit is tight but slidable. In this particular connection, it is critical that the end of the pipe be beveled so that the seal ring is not displaced as the connection is started.

Most often in the prior art two separate tools were necessary to accomplish both operations of cutting and beveling a pipe. Further, the cutting of the pipe with prior art devices was often not without undesirable side effects such as distortion of the pipe, uneven or non-perpendicular cuts, etc.

The most frequently utilized method in the prior art for different types and sizes of pipes comprises a number of rollers in a fixed open frame supporting one side of a pipe, with a circular cutting blade radially movable towards and through the other side of the pipe. This type of cutter is unacceptable for most plastic pipe, particularly thin walled plastic pipe, since distortion results through the use of such a tool. A V-shaped block rather than rollers has been utilized to support the pipe from one side. A straight blade may be utilized in place of the circular cutter.

A different approach is taken by combining two or more cutter sections to perform the cutting operation. Each cutter section comprises an open frame with rollers mounted thereon and a straight blade radially positionable between the rollers.

Yet another approach includes a closed frame which surrounds the pipe or tube and is radially adjustable to contact the pipe.

In one such device three radial rollers are used, each of which also have a straight blade cutting means. Spring pressure is applied to each of the rollers and each of the blades which causes holding and cutting of the pipe or tube evenly throughout the circumference. However, self-correction is totally dependent upon operator judgment in setting the spring pressure both on the rollers and the blades.

Another has adjustable slides at opposite sides of an essentially round, closed frame. The slides support rollers which contact a cylindrical surface to be knurled.

SUMMARY OF THE INVENTION

It is a general object of this invention to provide a tool for cutting pipe or tube and, more particularly, to provide a new and unique tool for cutting and beveling plastic pipe or tubing.

Other objects of this invention are to provide a new and unique tool which is capable of cutting a plastic pipe or tube without distortion and which is capable of beveling the outside surface of a pipe or tube to any desired degree at an edge.

Still other objects of this invention are to provide a new and unique tool for cutting plastic pipe which provides support for the pipe to be cut through use of a closed, circular frame, which provides a coarse, stepped adjustment for various nominal pipe diameters and which provides a fine adjustment for proper fit on differing pipe diameters.

Yet other objects of this invention are to provide a new and unique tool for cutting plastic pipe which supports the pipe on both sides of a cut being made, which includes a straight blade having a cutting edge and a beveling edge, and which provides an adjustable vertical stop utilized in conjunction with the cutting edge of the blade to support the pipe at its cut edge to provide a concentric bevel.

These and other objects and advantages of this invention will appear from the following description of the preferred embodiments, reference being made to the accompanying drawings.

BRIEF DESCRIPTION OF THE DRAWINGS

FIG. 1 is a front elevation view of the pipe cutter of this invention.

FIG. 2 is a partial cross-sectional view of the blade and its operating mechanism, taken generally along line 2—2 of FIG. 1.

FIG. 3 is a partial cross-sectional view of the rollers of the pipe cutter taken along line 3—3 of FIG. 1.

FIG. 4 is a partial cross-sectional view of the latching mechanism of the cutter taken along line 4—4 of FIG. 1.

FIG. 5 is a partial cross-sectional view of the roller slide of the cutter taken along line 5—5 of FIG. 1.

FIG. 6 is a partial cross-sectional view of the roller slide of the cutter taken along line 6—6 of FIG. 1.

FIG. 7 is a front elevation view of the cutter of this invention with a pipe having the maximum capacity diameter being inserted for cutting.

FIG. 8 is a front elevation view of the cutter of this invention with a pipe inserted for beveling of an already cut edge.

FIG. 9 is a diagramatic illustration of the invention indicating the advantage of the roller slide.

FIG. 10 is a partial cross-sectional view of the blade, pipe and roller slide taken along line 10—10 of FIG. 8.

DESCRIPTION OF THE PREFERRED EMBODIMENT

The particular pipe cutter built and described herein was designed to accommodate from one and one-half inch diameter to four inch diameter plastic pipe. The principles described and utilized are universal, however, and may be incorporated to either up-scale the device to accommodate larger sizes of pipe, or down-scale the device to accommodate smaller sizes of pipe.

FIG. 1 illustrates a pipe cutter, indicated generally at 10, according to this invention. The major components of the cutter 10 are an upper frame 12 and a lower frame 13. Both the upper 12 and lower 13 frames are semicircular in shape, generally, of a size sufficient to surround the maximum diameter pipe intended to be accommodated.

The upper 12 and lower 13 frames are designed so as to completely surround the pipe to be cut and for this reason the two frames are pivotally connected at one side by reason of a pin 15, or other suitable means, secured through a portion of each frame.

The other end of the frames 12 and 13 (right as shown) are capable of being releasably secured so that a pipe may be trapped therebetween. The upper frame 12 has a bolt 16 pivotally attached thereto by means of a pin or bolt 17. The lower frame 13 has a groove or channel 18 (FIG. 4) into which the bolt 16 fits when the frames 12 and 13 are closed. A wing nut 19 is provided on the bolt 16 for the purpose of securing the frames 12 and 13 together when the bolt 16 has been positioned within the groove 18.

The upper frame 12 is further provided with a flange 21 extending downward from the end of the frame having the bolt 16. The lower frame 13 has a channel 22 in the end of the frame having the groove 18. The channel 22 is of corresponding size relative to the flange 21. The purpose of the flange 21 and channel 22 is to provide a means of aligning the frames 12 and 13 when they are interlocked and secured by the bolt 16.

The upper frame 12 has a first pair of rollers 24 rotatably mounted thereon by reason of a bolt, pin, or other suitable means 25 positioned therethrough. A second pair of rollers 27 are likewise rotatably mounted on the upper frame 12 by reason of a bolt, pin or other means 28 therethrough. The first 24 and second 27 pairs of rollers are arranged so that they extend radially beyond the inside surface of the upper frame 12, as shown in FIG. 1. The frame is constructed and the rollers 24 and 27 attached to the frame 12 shown in FIG. 3.

The second pair of rollers 27 positioned closer to the ends of the upper frame 12 then the first pair 24. The first pair of rollers 24 is intended to contact all but pipes of the maximum allowable diameter of the particular tool (in this case four inch). The second pair of rollers 27 is intended to contact only pipes of the maximum diameter.

The lower frame 13 has a single pair of rollers 30 rotatably mounted therein by reason of a bolt or pin 31 positioned therethrough. The rollers 30 are positioned in the frame 13 so that they extend radially beyond the inside surface of the lower frame 13 as shown in FIG. 1. The rollers 30 are intended to contact only pipes of the maximum allowable diameter.

At the middle of the upper frame, 12, a pipe cutting blade, shown generally at 33, is provided. The blade 33 includes a cutting edge 34 and a beveling edge 35. Edge 35 is at an angle to provide for beveling the pipe. The cutting edge 34 extends radially beyond the beveling edge 35 a distance greater than the maximum pipe wall thickness anticipated (FIG. 2).

The blade 33 is positioned between the first pair of rollers 24 and is slideably mounted throught the upper frame 12. A boss 37 is provided on the upper frame 12 through which the blade 33 extends. The outermost surface of the boss 37 has an aperture 38 therethrough along with at least a portion is provided with threads, as by inserting an internally threaded collar 39. A threaded stud 41, with threads corresponding to the threaded collar 39, is inserted into the boss 37 by threading through the collar 39.

The end of the threaded stud 41, inside the boss 37, is provided with a ball 42. The upper end of the blade 33 is provided with a socket 43 corresponding to the ball 42 of the stud but extending the width of the blade. The relative dimensions of the ball 42 and socket 43 are such that once the ball has been inserted into the socket, the ball 42 is capable of rotating within the socket 43 but not moving longitudinally with respect to the socket.

The ball 42 is assembled to the socket 43 by placing the blade 33 into its slot 33A on the boss 37. This may be accomplished after the threaded stud 41 is inserted into the boss 37 and threaded collar 39.

Once the blade 33 has been attached as described above, the slot 33A in the boss 37 may be closed. A cover plate 45 is provided which encloses the slot 33A. The cover plate 45 is secured to the boss 37 by screw 46 or any other suitable means.

A knob or handle 48 is attached to the outer end of the threaded stud 41 by any suitable means for the purpose of allowing adjustment in the position of the blade 33. The blade 33 may be moved into or out of the enclosed area between the upper 12 and lower 13 frames by merely rotating the knob 48 one way or the other.

In the lower frame 13, between the rollers 30, and directly opposite the blade 33 is a roller slide, indicated generally at 50. The major component of the roller slide 50 is a long cylindrical shaft 51. The lower frame 13 includes, integral therewith and at the bottom thereof, a cylindrical boss 53 having an aperture 54 therethrough corresponding in size to the diameter of the cylindrical shaft 51.

The end of the shaft 51 exterior to the lower frame 13 has a knob or handle 56 attached thereto by means of a rod 57. The rod 57 is secured to both the cylindrical shaft 51 and the knob 56 by reason of threads (not shown) or other suitable means.

The end of the cylindrical shaft 51 interior to the lower frame 13 has a roller support formed integral with the cylindrical shaft 51. While the roller support and shaft in this embodiment are one piece, alternate constructions may be utilized wherein the two are separate originally but attached together by bolting, gluing, etc. The roller support 59 may be better understood with the aid of FIG. 6.

The roller support 59 is arcuate or V-shaped with approximately a ninety degree angle facing the interior of the lower frame 13. The roller support 59 is generally rectangular in shape when viewed from above, as in FIG. 6. The short ends of the rectangular shaped roller support 59 have flanges 60 extending in the (long end) length direction of the support, at each of the four corners. An aperture 61 is provided through each flange 60 in a manner causing adjacent flanges 60 on the short end of the rectangle to have the apertures 61 aligned.

A pair of rolers 62 and 63 are positioned between adjacent flanges 60 on the short side of the rectangle to the left and right (as shown in FIG. 6) respectively, in alignment with the apertures 61. A first pair of rollers 64 and 65 are positioned on either side of the roller support 59 at the left (as shown) adjacent the flanges 60 and in alignment with the apertures 61. A second pair of rollers 66 and 67 are likewise positioned on either side of the roller support 59 at the right (as shown) adjacent the flanges 60 and in alignment with the apertures 61.

A bolt 68 is positioned through the roller 62, the apertures 61 in the flanges 60 and the first roller pair 64 and 65. Likewise, a bolt 68 is positioned through the roller 63, the apertures 61 in the flanges 60, and the second roller pair 66 and 67. A self-locking nut 69, threaded onto each of the bolts 68, prevents any substantial axial movement of the rollers 62, 63, 64, 65, 66 and 67, while allowing all the rollers to rotate on the bolt 68. The position of the rollers 62 through 67 on the roller support 59 are arranged so that the rollers extend above the support to make first contact with any pipe placed thereon.

The purpose of the roller support 59 and its rollers 62 through 67, is to support a pipe for cutting or beveling. For this reason, the roller support 59 and the entire roller slide 50 is readily positionable in order to adjust for different diameter pipes. As noted above, the prior art has most often accomplished this through the use of a threaded shaft. The adjustment in this manner is considerably time consuming and wasteful in a case such as this where the pipe may vary from one and one-half inch to four inches in diameter. For this reason, the present invention utilizes a unique arrangement for the quick and accurate adjustment of the roller slide 50.

FIG. 5 shows the roller slide in cross-section with a portion of the lower frame 13 and in particular the cylindrical boss 53. As explained above, the cylindrical shaft 51 of the roller slide 50 is arranged to slide within the aperture 54 of the boss 53. The cylindrical shaft 51 has a slot 70 extending parallel to the axis of the shaft along substantially all of its length. Along the slot 70 a number of apertures 71 extend into the cylindrical shaft 51 at approximately one-half inch intervals. While the number of and spacing of the apertures 71 is not necessarily critical, they are arranged to be equivalent to the standard diameters of pipe sizes to be used.

The cylindrical boss 53 of the lower frame 13 has a stud 73 extending outward from one side thereof. The stud 73 has an aperture 74 extending therethrough up to and adjacent the cylindrical shaft 51. The cylindrical shaft 51 and cylindrical boss 53 are positioned so that the aperture 74 is aligned with the slot 70.

A plunger 76 is positioned within the aperture 74. The plunger 76 is a length of rod having a flange 77 permanently positioned along its length. A spring 78, between the flange 77 and the inside of the stud 73, constantly forces the plunger 76 inward. When one of the apertures 71 is properly aligned, the plunger 76 moves into the particular aperture. When an aperture 71 is not properly aligned the spring 78 forces the plunger 76 into the slot 70. In this manner, the cylindrical shaft 50 cannot rotate within the frame 13, but is always properly aligned.

A button or handle 80 is permanently secured to the end of the plunger 76 which extends out of the stud 73. The purpose of the button 80 is to enable the plunger to be withdrawn from the aperture 71 when repositioning of the roller slide 50 is desired.

FIG. 7 illustrates the use of the invention to cut a four inch diameter pipe, indicated generally at 83. Since the particular cutter 10 shown has a maximum diameter capacity of four inches, the roller slide 50 is completely retracted. The plunger 76 (not shown in FIG. 7) is inserted into the last aperture 71 causing the roller slide 50 to remain against the lower frame 13.

The cutter 10 in FIG. 7 is shown just prior to being closed on the pipe 83. As can be seen in the figure, the pipe 83 rests on the rollers 30 but does not contact the rollers 62 through 67 of the roller slide 50. When the upper frame 12 has moved completely down, the flange 21 will fit into the channel 22 (not shown in FIG. 7) allowing the bolt 16 and wing nut 19 to be utilized to secure the upper 12 and lower 13 frames together.

The upper 12 and lower 13 frames are snugged on the pipe 83 by tightening the wing nut 19. At this time, the rollers 27 will contact the pipe 83, but the rollers 24 will not. The cutter 10 is intended to be used on a pipe which is fixed in position either permanently through installation on site, or temporarily in a vise. In this respect, once the cutter 10 has been clamped onto the pipe 83, it is supported by the pipe.

The pipe 83 may now be cut by rotating the cutter 10 on the pipe 83 while slowly turning the knob 48 to move the blade 33 towards and through the pipe wall. The blade 33 should be moved into the upper 12 and lower 13 frames slowly as the cutter 10 is rotated so that a smooth, clean, straight cut is made. As the cutter is rotated, only rollers 27 and 30 and the blade contact the pipe 83.

FIG. 8 illustrates the cutter 10 in use with a pipe, indicated generally at 84, of a smaller diameter than the maximum capacity of the cutter 10. In this case, the roller slide 50 has been inserted into the area between the upper 12 and lower 13 frames by allowing the plunger 76 to be inserted into the aperture corresponding to the particular diameter of the pipe 84. The pipe 84 is positioned on the rollers 62 through 67 and the upper frame 12 moved down onto the pipe 84. Only rollers 24 in the upper frame 12 contact the pipe.

As before, the flange 21 fits into the channel 22 (not shown in FIG. 8) and the bolt 16 is inserted into the groove 18 while the wing nut 19 is tightened to snugly secure the pipe 84. Again, the pipe 84 is assumed to be fixed in position.

The cutter 10 is now rotated, as before, and the blade 33 slowly moved towards and through the pipe 84, by rotating the knob 48 (not shown in FIG. 8) to cut the pipe.

While the largest diameter pipe is adequately supported by the rollers 30 and 27 in order to obtain a straight cut, the roller slide 50 provides additional support for the smaller diameter pipes while cutting occurs. Through the use of FIGS. 5 and 9, it can be understood that as the cutter 10 is rotated on the pipe 84 in cutting the pipe, all of the rollers 62 through 67 on the roller slide 50 support the pipe. Since the blade 33 is cutting between the rollers 62 and 64 and 63 and 66, the pipe is supported both on the fixed side and the cut-off side.

This arrangement leads to greater stability and straight cuts. Because of this arrangement, the pipe being cut is supported along the entire axial length of all rollers contacted. In this manner, the pipe is restrained from shifting to counteract the pressure as the blade is forced against one point on the circumference of the pipe. Such shifting might result in spiralling of the cut or unevenly cut edges.

The illustration of FIG. 9 is useful to explain the advantages of and reasons for the design of the roller slide 50. Once the pipe 84 has been clamped between the upper 12 and lower 13 frames and the roller slide 50 and wing nut 19 adjusted, the rollers 24 and 62 through 67 support the pipe.

FIG. 9 illustrates the advantages of the present invention which advantages are more apparent on smaller diameter pipes. The tipping moment in a smaller diameter pipe 84 is illustrated by the triangle generally defined by lines 96 and 98 whereas the tipping moment in a larger diameter pipe 83 is defined by the triangle generally defined by lines 96 and 99. This drawing is a general representation of the tipping moments and it will be appreciated that the roller 24 which is illustrated, is at the approxiamate location where roller 27 engages the circumference of pipe 83.

From these triangles it will be apparent that the tipping moment is much more severe in smaller diameter pipe than in larger diameter pipe. The triangle defined by lines 96 and 97 illustrates the advantages of the present invention in counteracting the tipping moment when cutting smaller diameter pipe.

Prior to the end of the pipe being cut off, all of the outboard rollers 64 through 67 support the pipe and prevent the tipping moment from having any undesirble effects on cuts. Thus, tipping to the left is prevented by the rollers 64 and 66. Tipping to the right is prevented by rollers 65 and 67.

Returning to FIG. 8, once the pipe 84 has been cut, it may be desired that the cut edge be beveled. Whereas in many cases a separate tool has been required in order to bevel the cut edge of a pipe, the present cutter 10 also provides means for beveling the edge of a pipe. Assuming the pipe 84 held in the cutter 10 in FIG. 8 has just been cut, the edge may be beveled without removing the pipe from the cutter.

The face of the roller support 59 is provided with an aperture 86 having threads (FIG. 5). A stop plate 87 with an elongated aperture 88 is placed over the aperture 86 in the roller support. A thumbscrew 89 is inserted through the elongated aperture 88 and into the threaded aperture 86. The elongated aperture 88 is arranged so that when the thumbscrew 88 is loosened, the stop plate 87 may be moved up or down a distance equal to the length of the elongated aperture 88.

With the aid of FIGS. 8 and 10 it may be understood that when a cut edge of any pipe is desired to be beveled, the thumbscrew 89 is loosened, the stop plate is lifted towards the blade 33 to its furthest extent, and the thumbscrew 89 is tightened. The blade 33 is moved into the pipe 84 until the beveling edge 35 just touches the pipe. The stop plate 87 and the cutting edge 34 of the blade are arranged to be in the same plane. This status of the components of the cutter 10 is shown in FIG. 10.

In order to bevel the edge of the pipe 84, the cutter 10 is rotated on the pipe while the blade 23 is moved inward as described above. At this stage it is important to note that the purpose of the overhanging cutting edge 34 of the blade 33 and the uplifted stop plate 86 is to assure uniformity of the beveling throughout the circumference of the pipe 84. As the cutter is rotated, it is also constantly forced inward so that the edge 34 of the blade 33 and the stop plate 87 are both maintained under pressure in contact with the pipe 84. Whatever the degree of bevel desired, the result is uniform as long as the inward pressure is maintained.

Modifications, changes and improvements to the preferred forms of this invention herein disclosed, described and illustrated may occur to those skilled in the art who come to understand the principles and precepts thereof. Accordingly, the scope of the patent to be issued herein should not be limited to the particular embodiments of the invention set forth herein, but rather should be limited by the advance by which the invention has promoted the art.

What is claimed is:

1. Apparatus for cutting and beveling plastic pipe including in combination a closed frame comprising first and second frame members, each said first and second frame members having first and second end portions and having a semicircular configuration, pivot means pivotally connecting said first end portions of said first and second frame members together whereby said frame members may be swung between open and closed positions, said frame members in said closed position forming a generally circular configuration, adjustable latching means for connecting said second end portaions of said first and second frame members together in said closed position, said adjustable latching means providing a means for adjusting the proximity of said second end portions of said frame members in their said closed position and thereby adjusting the circumferential extent of said generally circular configuration, cutting blade means including a cutting edge and a beveling edge, means mounting the cutting blade means on said first frame member for radial movement of said cutting blade means between a retracted position and a cutting position, a first pair of rollers rotatably mounted on said first frame member, said first pair of rollers positioned one on either side of said cutting blade means, roller slide means including a second, third and fourth pair of rollers rotatably mounted on said roller slide means, means mounting the roller slide means on said second frame member for radial movement of said roller slide means between a retracted position and a supporting position, said rollers on said roller slide means and said rollers on said first frame member supporting a pipe in said supporting position of said roller slide means and said closed position of said first and second frame members, said rollers of said second pair of rollers being mounted at opposed portions of said roller slide, said rollers of said third pair of rollers being mounted respectively at opposed ends of one of said rollers of said second pair of rollers, and said rollers of said fourth pair of rollers being mounted respectively at opposed ends of the other of said rollers of said second pair of rollers.

2. The apparatus according to claim 1 in which said means mounting the roller slide provides a coarse adjust and said adjustable latching means provides a fine adjust for clamping a plurality of pipe sizes.

3. The apparatus according to claim 1 in which said second, third, and fourth pair of rollers mounted on the roller slide means are arranged on two parallel axes extending parallel to the axial length of a pipe to be positioned on said roller slide means.

4. The apparatus according to claim 3 in which said adjustable latching means releasably secures a pipe between said first and second frame members by tightening said first, second, third, and fourth pair of rollers against the pipe.

5. The apparatus according to claim 3 in which said cutting blade means extends towards said roller slide means at a place between the rollers of said second pair of rollers.

6. The apparatus according to claim 3 in which a positionable pipe stop is provided on the roller slide to cause a pipe to be positioned relative to said cutting blade means allowing the beveling edge to contact a surface of the pipe.

7. The apparatus according to claim 6 in which a surface on said positionable pipe stop and a surface on said cutting edge of said blade means are located in the same plane and provide a forward stop for a pipe to assure alignment of a pipe to accurately bevel an edge of a pipe.

8. The apparatus according to claim 3 in which one of said rollers of each of said third and fourth pairs of rollers provide support for a portion of a pipe being cut off while the remainder of the rollers support the balance of the pipe.

9. The apparatus according to claim 8 in which the third and fourth pair of rollers assure contact along the full axial length of the said first, second, third, and fourth pairs of rollers contacting a pipe during cutting resulting in perpendicular cutting of a pipe.

10. An apparatus for cutting and beveling plastic pipe comprising a first frame member, a second frame member, means pivotally connecting a first end of said first and second frame members together, latching means securing a second end of said first and second frame members together, a blade means including a cutting edge and a beveling edge, means rendering said blade means radially adjustable through said first frame member toward and away from said second frame member, a roller slide, means rendering said roller slide radially adjustable through said second frame member toward and away from said first frame member, at least one pair of rollers rotatably mounted on the first frame member on opposite sides of said blade means, a plurality of rollers rotatably mounted on the roller slide, said roller slide positioned opposite the blade means, said plurality of rollers on said roller slide arranged in three pairs mounted on two parallel axes, said rollers of said first pair on said roller slide being located opposite respectively said rollers of said first pair on said first frame member, said rollers of the second pair on said roller slide being located respectively at opposite ends of one of said rollers of said first pair on said roller slide, said rollers of said third pair on said roller slide being located respectively at opposite ends of the other of said rollers of said first pair on said roller slide, said blade means extendable toward said roller slide between said rollers of said first pair on said roller slide and one roller of said second pair and one roller of said third pair.

11. An apparatus for cutting and beveling pipe including in combination frame means having first and second opposed portions, blade means mounted on said first portion of said frame means and including a cutting edge and a beveling edge, means for moving said blade means toward and away from said second portion of said frame means to cut a pipe and locate said blade means at a beveling position pipe engaging rollers mounted on said first and second opposed portions of said frame means, said cutting edge having a flat surface portion, a pipe stop supported at said second opposed portion of said frame means and having a flat surface portion lying generally in the same plane as said flat surface portion of said cutting edge, means for moving said pipe stop between operative and inoperative positions, said flat surface portion on said pipe stop in the operative position thereof and said flat surface on said cutting edge in said beveling position of said blade means adapted to engage the end of a pipe to keep the pipe aligned during beveling by said beveling edge.

12. An apparatus for cutting and beveling plastic pipe comprising a first frame member arcuate in shape, a second frame member arcuate in shape, means pivotally connecting a first end of said first and second frame members together, adjustable latching means securing a second end of said first and second frame members together, said adjustable latching means providing a fine adjustment for varying pipe sizes, a blade means including a cutting edge and a beveling edge, means for rendering said blade means continuously radially adjustable through said first frame member, a roller slide, means rendering said roller slide radially adjustable through said second frame at a plurality of finite positions, said means rendering said roller slide radially adjustable providing a course adjustment for varying pipe sizes, at least one pair of rollers rotatably mounted on the first frame member, a plurality of rollers rotatably mounted on the roller slide, said roller slide positioned directly opposite the blade means and extending between the first and second frame members, said plurality of rollers arranged in pairs mounted on two parallel axes, said blade means extendable towards the roller slide between said pairs of rollers, said at least one pair of rollers extending from an inner surface of the first frame member, said plurality of rollers extending from an inner surface of the roller slide, with an axial length parallel to an axial length of a pipe positioned thereon, whereby a pipe placed between the first and second frame member is supported by said at least one pair of rollers and the said plurality of rollers.

13. An apparatus for cutting and beveling pipe including in combination frame means having a generally circular configuration, blade means including a cutting edge and a beveling edge, means rendering said blade means continuously, radially adjustable through said frame means, a roller slide, a positionable pipe stop on said roller slide, said positionable pipe stop and said cutting edge of said blade means being located in the same plane and providing a stop for a pipe, means rendering the roller slide radially adjustable through said frame means at a plurality of finite positions, said roller slide positioned directly opposite the blade means on said frame means, a pair of rollers rotatably mounted on the frame means, and a plurality of rollers rotatably mounted in pairs on parallel axes on said roller slide and at least two of the rollers being mounted outboard of the roller slide to support a portion of a pipe being cut.

* * * * *